May 13, 1952 LA VERNE R. PHILPOTT 2,596,167

SIGNAL GENERATING DEVICE

Filed Oct. 10, 1945 2 SHEETS—SHEET 1

Inventor
LA VERNE R. PHILPOTT

By Ralph L. Chappell

Attorney

May 13, 1952 LA VERNE R. PHILPOTT 2,596,167

SIGNAL GENERATING DEVICE

Filed Oct. 10, 1945 2 SHEETS—SHEET 2

Inventor
LA VERNE R. PHILPOTT

By Ralph L. Chappell

Attorney

Patented May 13, 1952

2,596,167

UNITED STATES PATENT OFFICE 2,596,167

SIGNAL GENERATING DEVICE

La Verne R. Philpott, Washington, D. C.

Application October 10, 1945, Serial No. 621,636

9 Claims. (Cl. 250—36)

(Granted under the act of March 3, 1883, as amended April 30, 1928; 370 O. G. 757)

This invention relates to systems for producing recurrent saw-tooth signals and in particular to systems for producing saw-tooth signals having three distinct parts (viz. a linearly changing period, a flyback period, and a quiescent period) in which the linearly changing period is of substantially shorter time duration than the total period of the three parts.

In numerous applications saw-tooth voltage or current waveforms having the characteristic of changing substantially linearly with the passage of time are required. Typical of these applications is oscillography wherein a saw-tooth voltage or current signal is required to produce a linear time base in one dimension across the face of a cathode ray tube. To produce the saw-tooth signal it is general practice to control the flow of energy to or through an energy storage device so that a saw-tooth voltage or current waveform results. The rate of change of this saw-tooth signal can be selectively varied by altering either the size of the energy storage device or the rate of flow of energy to the storage device but unless some means is provided for a proportional alteration of the duration of the changing period, the magnitude of the current or voltage saw-tooth signal produced will change when the rate of change of the saw-tooth signal is altered. This variation in the maximum amplitude of the signal is frequently objectionable, for example, in oscillography where the deflection sensitivity of a cathode ray tube is relatively independent of the rate of change of the deflecting signal.

Therefore, an object of this invention is to provide a system for producing a substantially linearly changing waveform in which the maximum amplitude of the change produced during the linear changing period remains constant regardless of selective variations in the average rate of change of the waveform.

Another object of this invention is to provide a means for altering the length of the substantially linearly changing period of a saw-tooth signal generator of the aforementioned type so that the maximum signal change produced during the substantially linearly changing period remains constant regardless of selective variations in the rate of change of the signal.

Another object of this invention is to provide a means for altering the length of the substantially linearly changing period in a saw-tooth voltage or current signal generator of the aforementioned type so that the maximum signal amplitude attained during the period is constant and independent of the rate of change of the saw-tooth signal.

Other objects and features of the present invention will become apparent upon a careful consideration of the accompanying drawing showing certain preferred embodiments of the present invention.

Figure 1:
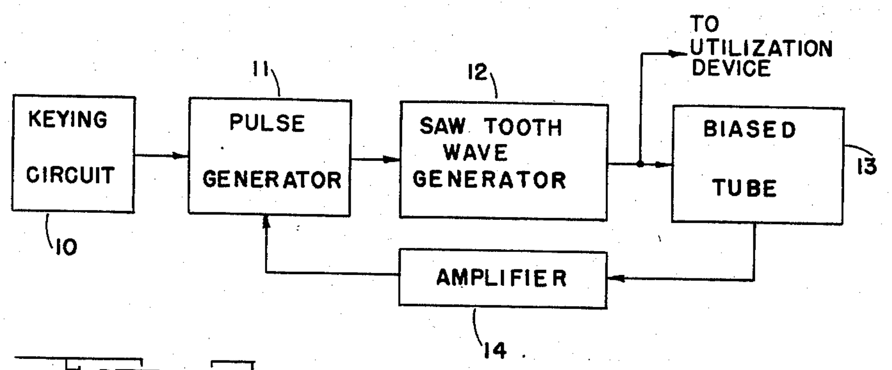
Fig. 1 is a block diagram showing the general features of the present invention.

Referring now more particularly to the example shown in Fig. 1, a series of signals produced by the keying circuit 10 is applied to a pulse generator 11. The pulse generator 11 is preferably of a type having two possible states in one of which the saw-tooth wave generator 12 is held inoperative. In response to each of the keying signals from circuit 10, the pulse generator 11 enters a first state producing a gating signal or pulse which causes the saw-tooth wave generator 12 to produce a signal having the characteristic of changing substantially linearly with the passage of time. When this changing signal reaches a predetermined amplitude the conduction condition of a biased electron tube 13 is changed from non-conducting to conducting or vice versa to produce thereby an output signal. This output signal is amplified by a system 14 provided for that purpose and applied to the pulse generator 11 to cause a termination of the gating pulse applied to the saw-tooth generator 12. When this occurs, the saw-tooth wave generator 12 is also returned to its original inoperative condition and held there until the application of a second keying signal to the pulse generator 11 from the keying circuit 10 causes a repetition of the process.

Figure 2:
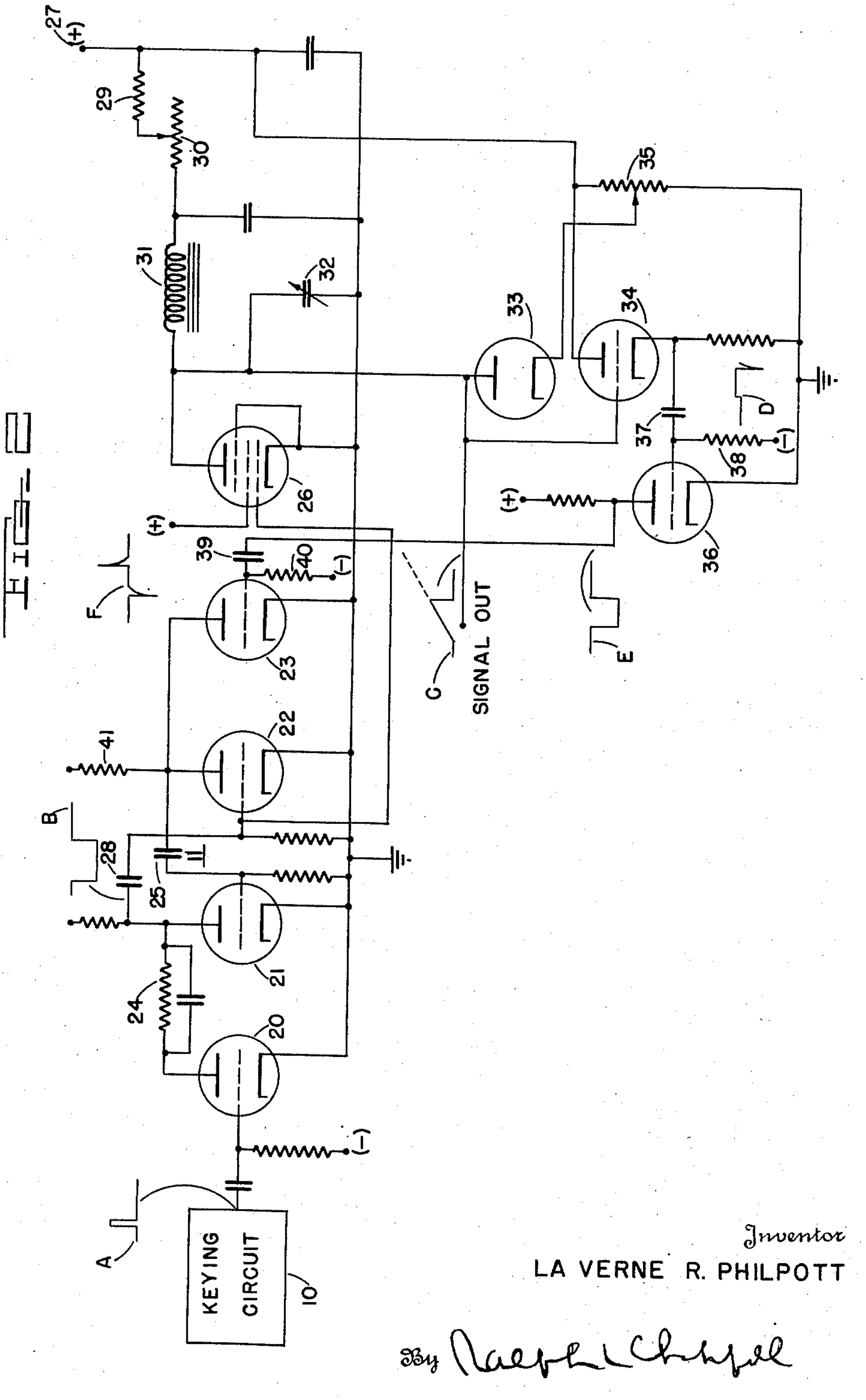
Fig. 2 is a schematic diagram, partly in block, of a specific circuit designed to perform functions as hereinbefore outlined.

With reference to Fig. 2, a particular embodiment of the features of the present invention is shown as applied to the generation of a saw-tooth voltage waveform. It is understood, however, that the principles of the present invention are equally applicable to a saw-tooth current generator since it is merely necessary to insert a small resistance in a circuit utilizing the saw-tooth current to produce a saw-tooth voltage which may then be amplified, if necessary, for amplitude control purposes.

A series of pulses, typified by the single pulse in waveform A, is generated by the keying circuit 10 and applied to tube 20 of the pulse generator, which comprises a multivibrator, tubes 21, 22, and the multivibrator trigger tubes 20, 23, although other forms of pulse producing circuits could be used. The plate of tube 20 is connected to the plate of tube 21 through an isolating resistance 24. The plate of tube 23 is direct connected to the plate of tube 22. In the quiescent condition wherein pulses are not applied to the grid of tube 20, both tubes 20 and 23 are held non-conducting by reason of a negative bias applied to their control grids. Also, in this condition the multivibrator 21, 22 operates at a low frequency determined primarily by the time constant of the discharge path of capacitance 25. Upon application of a positive keying pulse to the grid of tube 20, however, conduction by tube 20 is instituted, producing a drop in potential at the plate of tube 21 which is applied to the grid of tube 22 by means of capacitance 28. A typical voltage waveform produced at the plate of tube 21 is indicated by the letter B.

In this illustration the control grid of the switch tube 26 is connected to the grid of tube 22, thus under conditions which produce conduction by tube 22, tube 26 is also rendered conducting, drawing plate current from the positive supply 27 through resistances 29, 30 and inductance 31. When conduction by tube 21 is instituted either as a result of the application of a positive pulse to the grid of tube 20 or the natural oscillatory action of the multivibrator 21, 22 when not being externally triggered, tube 26 becomes cut-off. The cessation of conduction by tube 26 is accompanied by a rise in potential at the plate of that tube as a part of the energy contained within inductance 31 is transferred to the capacitance 32. Thus a sinusoidally rising potential is produced across capacitance 32 as that element charges.

The rising voltage thus produced across capacitance 32 is applied to the plate of a diode tube 33 and to the control grid of a cathode follower 34 through direct conductive connections. Since the cathode of tube 33 is returned to a source of positive potential 27 through the variable resistance 35, tube 33 is held non-conductive and the potential across capacitance 32 is free to rise until it exceeds the potential maintained at the cathode of tube 33. When this potential is exceeded, tube 33 becomes conductive to prevent a further rise in the substantially linearly changing voltage produced across capacitance 32. Thus, the potential rise across capacitance 32 is limited to a voltage corresponding to that maintained on the cathode of tube 33.

The clipper-amplifier 36 is connected to the cathode of tube 34 by means of a short-time constant coupling circuit comprising capacitance 37 and resistance 38. Tube 36 is normally maintained near cut-off as a result of a negative potential applied to its control grid through resistance 38. However, during the rise in potential across capacitance 32, the grid of tube 36 is driven slightly positive permitting full conduction by the plate of tube 36. Grid current drawn by tube 36 produces a charging of capacitance 37 and, as long as this charging current is constant, as would be the case during a linear change in voltage across capacitance 32, the plate current drawn by tube 36 remains substantially constant. Conduction by tube 33, however, stops the constant charging rate and, upon differentiation by the short time constant circuit 37, 38, produces a sharp negative edge as shown in waveform D. This sharp potential drop, applied to the grid of tube 36, interrupts the flow of plate current in tube 36 producing a rising potential at the plate.

The negative pulse thus produced at the plate of tube 36 as that tube is driven first to conduction and then returned to a cut-off condition (waveform E) is applied by means of a short time constant coupling circuit comprising capacitance 39 and resistance 40 to the grid of the multivibrator trigger tube 23. The differentiating action of this coupling circuit produces therefrom the alternate negative and positive pulses shown in waveform F which are applied to the grid of tube 23. Tube 23 is normally non-conducting as a result of a negative potential maintained at its grid through resistance 40 and is therefore unaffected by the negative pulses, however, the positive pulse produced coincidentally with the start of conduction by diode 33 causes conduction by tube 23. Conduction by tube 23 produces a drop in potential across the plate load resistance 41 common to both tubes 22, 23 so that the grid of tube 21 is driven negative. This results in the return of the multivibrator 21, 22 to its initial condition with tubes 22, and 21 conducting and non-conducting respectively, and also causes the switch tube 26 to return to conduction, thereby discharging capacitance 32 to its original potential as determined by the potential drop through the resistances 29, 30 and the resistance of the winding of inductor 31. The multivibrator thereafter remains in this condition until the discharge of capacitance 25 or the prior application of a positive pulse to the grid of tube 20 causes tube 21 to return to conduction. It is therefore apparent that where the generation of a linearly changing voltage is desired in synchronism with keying signals from the keying circuit 10, the natural period of the multivibrator tubes 21, 22 must be sufficiently long with respect to the repetition period of the keying signals so that the normal free running action of the multivibrator does not occur. In this typical illustration the changing voltage produced is actually a part of a damped sinusoidal wave; however, it is linear (within 3%) if the actual rise produced across capacitance 32 is less than half the voltage which would be produced were tube 26 to remain in the cut-off state.

Since some control over the maximum voltage attained during the linearly changing part of the cycle is normally required, the cathode of tube 33 is returned to a variable positive voltage indicated by the potentiometer 35 placed between a source of positive voltage 27 and ground. Thus, the point at which conduction by tube 33 is initiated and hence the maximum amplitude attained during the linear changing period is readily variable.

In many applications it is desirable to provide a means for varying the rate of rise of the linearly changing waveform. In the typical circuit of Fig. 2 a variation in the rate of rise of the voltage across capacitance 32 will represent a change in the time required for the voltage to reach the potential maintained at the cathode of tube 33 and consequently reflect a change in the period of non-conductivity by tubes 22 and 26. The alteration in the rate of rise is easily provided in the circuit of Fig. 2 by varying the size of either capacitance 32 or resistance 30 and is increased by decreasing the size of either variable element. To prevent damage to tube 26 when resistance 30 is made small for a fast rate of rise, a fixed resistance 29, which is primarily current limiting in function, is placed in series with resistance 30. This resistance is selected so that even with resistance 30 in the minimum resistance position, the maximum rated plate dissipation of tube 26 is not exceeded.

Figure 3:
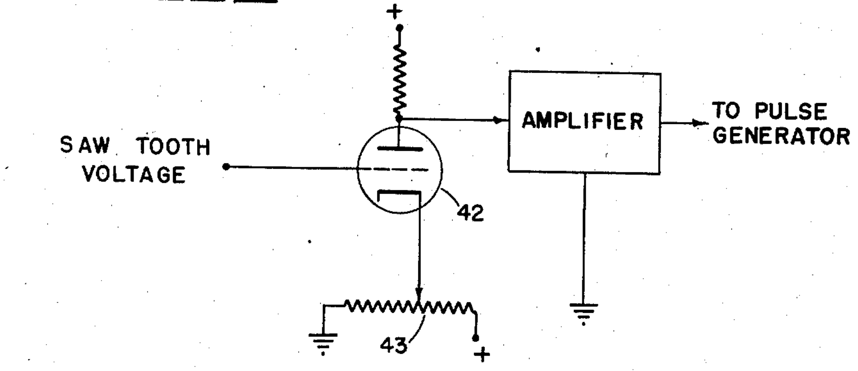
Figs. 3 and 4 show suitable additional connections to a biased electron tube employed to terminate the linearly changing period of the saw-tooth signal generator.
Figure 4:
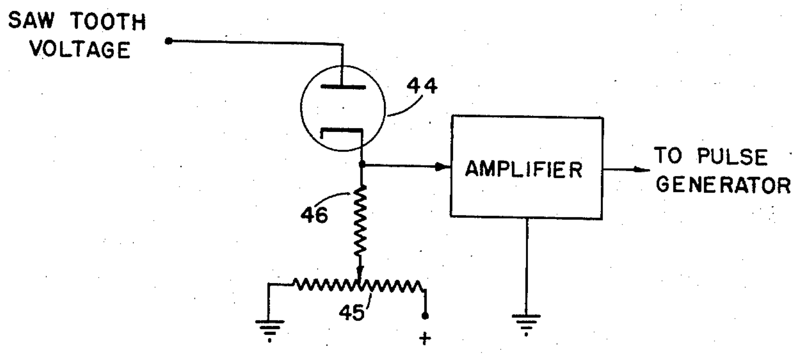

Figs. 3 and 4 show alternate methods of connecting the biased electron tube in a signal generator circuit typified by that of Fig. 2. In Fig. 3 a biased triode tube 42 is used. A positively rising saw-tooth voltage is applied to the control grid of tube 42 and a positive voltage is maintained on the cathode from potentiometer 43. Potentiometer 43 is adjusted so that the cut-off bias on tube 42 will be overcome and that tube brought to conduction when the rising saw-tooth voltage reaches the desired level. When this occurs tube 42 is brought to conduction and a drop in voltage is experienced at its plate. This drop in voltage is then amplified and applied to the pulse generator 11 of Fig. 2 to cause the termination of the saw-tooth signal. In this connection it should be noted that the signal output from tube 42 could be obtained from a resistance placed in its cathode circuit however, with such a cathode resistor the circuit is highly degenerative and the voltage amplification of tube 42 is not obtained.

Fig. 4 employs a diode as the biased tube in a manner similar to that of Fig. 2 but utilizes a different method of applying the terminating pulse to the pulse generator. As before, the diode 44 is brought to conduction when the rising saw-tooth voltage applied to its plate exceeds the voltage maintained at the cathode from potentiometer 45. When this occurs, a voltage change is experienced across the diode cathode resistance 46 which is amplified and applied to the pulse generator 11 of Fig. 2 to cause a termination of the saw-tooth signal.

From the foregoing discussion it is apparent that considerable modification of the features of this invention are possible, and while the devices herein described, and the form of apparatus for the operation thereof, constitute preferred embodiments of the invention it is to be understood that the invention is not limited to these precise devices and forms of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. In combination, a pulse generator operable to generator a continuing impulse, an adjustable slope saw-tooth signal generator, said saw-tooth signal generator coupled to said pulse generator and operable in response to the start of an output signal from said pulse generator to start the production of the leading edge of saw-tooth wave which continues for the duration of the output signal from said pulse generator, a biased limiting circuit connected to said saw-tooth signal generator and operative to produce an output signal when the leading edge amplitude of said saw-tooth wave reaches a predetermined value, and feedback means applying the signal produced by said biased limiting circuit to said pulse generator to cause the termination of the output signal produced thereby and hence the termination of the output saw-tooth wave whereby the slope of said saw-tooth wave may be adjusted without altering the amplitude thereof.

2. In combination, a pulse generator having at least two states of conductivity operable to generate a continuing impulse, an adjustable slope saw-tooth signal generator, said saw-tooth generator operable in response to the initiation of a first one of said states of said pulse generator to initiate the production of the leading edge of a saw-tooth signal the duration of which continues for the duration of said first state of said pulse generator, an amplitude responsive device including at least one electron tube connected to said saw-tooth signal generator and biased to change conduction conditions simultaneously with the attainment of a predetermined amplitude of the leading edge of said saw-tooth signal, and feedback means interposed between said amplitude responsive device and said pulse generator including at least a differentiating connection causing said pulse generator to change to a second conduction condition and thereby terminate the saw-tooth signal simultaneously with the change in conduction condition of said amplitude responsive device whereby the slope of said saw-tooth signal may be altered without altering the amplitude thereof.

3. In combination, a pulse generator having at least two states of conductivity operable to generate a continuing impulse, and adjustable slope saw-tooth signal generator, said saw-tooth generator operable in response to the initiation of a first one of said states of said pulse generator to initiate the production of the leading edge of a saw-tooth signal the duration of which continues for the duration of said first state of said pulse generator, an amplitude responsive device including at least one electron tube connected to said saw-tooth signal generator and biased to change conduction conditions simultaneously with the attainment of a predetermined amplitude of the leading edge of said saw-tooth signal, variable biasing means for altering said predetermined amplitude, and feedback means interposed between said amplitude responsive device and said pulse generator, including at least a differentiating connection causing said pulse generator to change to a second conduction condition and thereby terminate the saw-tooth signal simultaneously with the change in coduction condition of said amplitude responsive device whereby the slope of said saw-tooth signal may be altered without altering the amplitude thereof.

4. In combination, a pulse generator having at least two states of conductivity operable to generate a continuing impulse, an adjustable slope saw-tooth signal generator, said saw-tooth generator operable in response to the initiation of a first one of said states of said pulse generator to initiate the production of the leading edge of a saw-tooth signal the duration of which continues for the duration of said first state of said pulse generator, an amplitude responsive device including at least one electron tube connected to said saw-tooth signal generator and biased to change conduction conditions simultaneously with the attainment of a predetermined amplitude of the leading edge of said saw-tooth signal, and feedback means applying the signal produced by said amplitude responsive device to said pulse generator to cause the termination of the first state thereof and hence the termination of the output saw-tooth wave whereby the slope of said saw-tooth signal may be altered without altering the amplitude thereof.

5. In combination, a pulse generator operable to generate a continuing impulse, an adjustable slope saw-tooth signal generator, said saw-tooth signal generator coupled to said pulse generator and operable in response to the start of an output signal from said pulse generator to start the production of the leading edge of saw-tooth wave which continues for the duration of the output signal from said pulse generator, a biased limiting circuit connected to said saw-tooth signal generator and operative to produce an output signal when the leading edge amplitude of said saw-tooth wave reaches a predetermined value, and feedback means between said biased limiting circuit and said pulse generator including at least a differentiating connection causing the termination of the output signal from said pulse generator, thereby terminating the saw-tooth signal simultaneously with the change in conduction condition of said amplitude responsive device whereby the slope of said saw-tooth wave may be adjusted without altering the amplitude thereof.

6. In an energy wave-reflection type ranging system, a sweep slope control circuit for a cathode-ray oscilloscope indicator which comprises a start-stop multivibrator circuit responsive to energy pulses from the transmitter of the system to start said multivibrator circuit, a sweep generating circuit including a vacuum tube having at least an anode, a control electrode and a cathode, and a resistance capacity timing circuit in the anode circuit of said tube said timing circuit having a variable resistor portion thereof said sweep circuit being cooperatively connected to said multivibrator circuit, an amplifier responsive to the potential established across the capacity of said resistance capacity circuit, and a circuit cooperatively coupling said amplifier to said multivibrator circuit, said last-mentioned coupling circuit including a biased limiting circuit and providing a stopping signal to said multivibrator circuit at the instant the potential supplied from said amplifier exceeds the limiting bias, whereby the effective slope of the sweep wave output of said amplifier can be adjusted to any value within a wide range of values by the sole adjustment of the variable resistor portion of said resistance capacity circuit without altering the limiting values of said sweep wave.

7. In a wave-reflection type object-detection and ranging system, a sweep control circuit comprising a first device for initiating a substantially squared-top pulse, a second device for initiating a saw-tooth shaped pulse in response to the receipt of said squared-top pulse from said first device, a third device responsive to the saw-toothed pulse initiated by said second device to generate a sharp terminating pulse at the instant said saw-toothed pulse reaches a predetermined amplitude, said third device being cooperatively connected to said first device to terminate by said sharp terminating pulse the square-top pulse initiated by said first device, whereby adjustment of slope of said saw-toothed pulse is alone required to provide any one of a plurality of saw-toothed sweep waves all of which will be terminated upon reaching said predetermined amplitude.

8. In an adjustable electrical control circuit for controlling the sweeping rate of an oscilloscopic indicating device, a first means responsive in its initial state to a first short electrical control pulse to initiate a longer electrical control pulse and responsive in the latter state to a second short electrical control pulse to terminate said longer control pulse and resume its initial state, a second means cooperatively connecting to said first means and responsive to said longer control pulse to initiate an electrical sweep wave of predetermined form and to terminate said sweep wave and restore to its initial state upon termination of said longer control pulse, and a third means cooperatively connecting with said second means and said first means and responsive to energy of said electrical sweep wave of said second means upon said sweep wave attaining a predetermined amplitude to provide said first means with a suitable short electrical pulse to cause said first means to terminate said longer control pulse and to resume its initial state.

9. In an adjustable electrical sweep control circuit for an oscilloscopic indicating device, the combination of a prepulser circuit, an adjustable sweep wave generating circuit, a sweep amplifying circuit and a sweep limiting circuit, said prepulser circuit being initially arranged to initiate a continuing pulse in response to a first substantially instantaneous pulse and to terminate said continuing pulse in response to a second substantially instantaneous pulse, said sweep wave generating circuit being connected to the output of said prepulser and being arranged to initiate and terminate the generation of a sweep wave having a predetermined law of variation in response to the leading and trailing edges of said continuing pulse from said prepulser, respectively, said sweep amplifying circuit being connected to said sweep wave generating circuit to amplify the output thereof, said sweep limiting circuit being connected to said amplifying circuit to derive energy of said amplified sweep wave therefrom and responsive to said energy when the same has reached a predetermined amplitude to generate a sharp pulse, the output of said pulser circuit connecting to said prepulser circuit whereby the sharp pulse thereof is made to terminate the said continuing electrical pulse being generated by said prepulser circuit and the entire circuit is restored to its initial state.

LA VERNE R. PHILPOTT.

REFERENCES CITED

The following references are of record in the file of this patent:

UNITED STATES PATENTS

| Number | Name | Date |
|---|---|---|
| 2,265,290 | Knick | Dec. 9, 1941 |